Dec. 4, 1962    A. B. HILDEBRANDT    3,067,404
VIBRATION DETECTOR
Filed Nov. 6, 1958
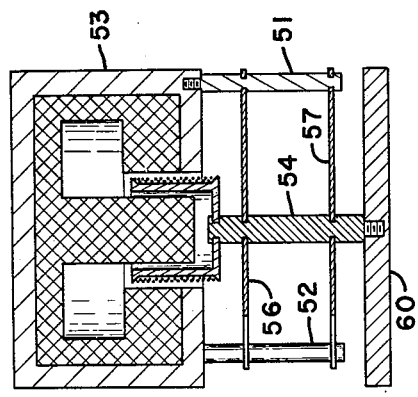
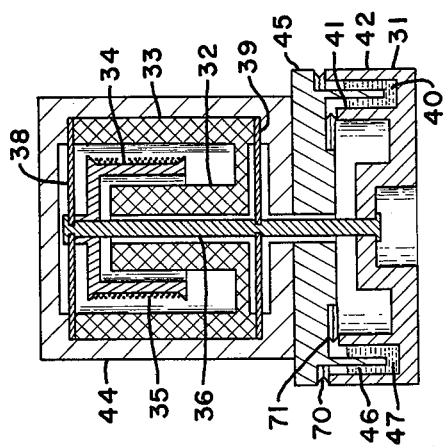
Alexander B. Hildebrandt    Inventor
By James A. Reilly    Attorney

3,067,404
VIBRATION DETECTOR
Alexander B. Hildebrandt, Tulsa, Okla., assignor to Jersey Production Research Company, a corporation of Delaware
Filed Nov. 6, 1958, Ser. No. 772,290
7 Claims. (Cl. 340—17)

This invention relates to vibration detectors and more particularly to vibration detecting devices which can be easily placed in seismic surveying operations with a high degree of coupling between the earth and the instrument.

Electrical devices for recording vibrations and for converting seismic impulses into variable electrical energy are generally called seismometers, detectors, geophones and the like. The most common of these are the electromagnetic devices of the variable reluctance and dynamic type. An electromagnetic seismometer usually consists essentially of a casing in which is yieldingly suspended, by springs or the like, a movable mass sometimes called a steady mass. A winding and means for establishing a magnetic flux through the winding to induce current flow therein are so operatively connected to the casing and the steady mass that relative displacement of the casing and mass results in variation of the flux to vary the voltages developed in the winding. Consequently when the seismometer casing is supported on or near the surface of the earth and seismic impulses are propagated in the earth by an explosive charge, these impulses are transmitted to the casing which thus partakes of motion with respect to the steady mass. This relative motion is thereby converted into electrical energy by reason of the resulting variation in magnetic flux in the seismometer winding.

In the variable reluctance type device variations in magnetic flux are obtained by altering the reluctance of the magnetic circuit. Operation of a dynamic seismometer, on the other hand, depends upon the fact that either the winding or the means for establishing the magnetic field is supported for displacement with respect to the casing. Recently, the most commonly used seismometers have been of the moving coil type in which the position of a coil relative to a magnetic field of substantially constant strength is varied by earth movement causing a cutting of magnetic lines of force by the coil or coils, thus generating electric currents or potentials therein. With either type of instrument the electrical energy is then amplified and recorded in a manner conventional in the art of seismic survey. While applicable with the variable reluctance type of device, the present invention is particularly concerned with seismometers belonging to the last mentioned group of the electromagnetic type, that is, the dynamic geophones.

In accordance with general practice, several hundred individual geophones properly oriented and connected to recording equipment often are required for the recordation of a conventional multiple trace seismic record. Heretofore, a major problem involved in the use of such devices for seismic surveying has been the time consuming, tedious efforts necessary to place each and every detector with good ground connection and in a position where the instrument was properly oriented to insure effective operation. Further it has been found that coupling to the earth for recording the seismic energy is of extreme importance under many conditions. For example, in order to assure adequate coupling, geophones have been designed with pointed spikes which must be firmly driven into the earth. Other types of devices require spading of the top vegetation for securing a firm plant of the geophone to the earth. These methods also require special effort and time, particularly in an exploration operation where surface vegetation does not permit the faithful recording of the earth's motion with conventional vibration detectors.

The present invention is directed to the provision of a detector for seismic surveying apparatus which minimizes the expenditure of time in placing detector groups or spreads. More particularly, a light weight geophone is provided which requires no special plant or spikes and which has excellent coupling to the earth.

In accordance with the present invention a vibration-responsive device of high sensitivity is provided which comprises a rigid base component of small inertia, a movable mass of large inertia resiliently suspended from the base component for reciprocal movement with respect thereto, and a signal generating coil in which current flow is induced in response to the relative movement between the base component and the movable mass of large inertia, the mass ratio of the movable mass to the base component being in the range of 1:1 to 15:1. Specifically, the present invention is directed to a geophone in which the heavy portion is not required to move in response to earth's vibrations while the lighter elements coupled to the earth's surface easily follow the motion of the earth even though a layer of vegetation is interposed. Thus, the novel device has the static characteristics of a heavy geophone but the dynamic characteristics of a light geophone.

In accordance with a preferred embodiment of the present invention there is provided a geophone having a light, rugged casing on which is mounted a light coil form. A relatively heavy magnet assembly is resiliently mounted on the casing in such a position that its magnetic field will pass through the windings of the coil. The movable mass of large inertia comprising the magnet assembly causes the geophone to seat firmly on the earth. However, a seismic vibration incident on the geophone moves only the casing and the coil while the heavy magnet assembly remains virtually stationary. Thus, vibrations result in movement of only the light elements of the geophone while the seating contact between the geophone and the earth is determined by the total weight of the device.

In reflection recording the frequency range of operation is generally from 30 to 200 cycles per second. Therefore, it is desirable to have coupling to the earth which adequately insures that the natural frequency of the mass which moves to follow earth displacement is higher than 200 cycles per second. In accordance with the present invention this is accomplished by making the mass of the base component, including the lower case, connecting shaft and coil, as small as possible while the movable mass of large inertia resiliently suspended from the base component is designed to have a mass as high as is practical. Most advantageously such detectors are fabricated so that the mass ratio of the movable mass to the base component is in the range of 1:1 to 15:1. The movable mass is thus suspended to create a great static force on the base component, but the small inertia of the base component, due to its small weight, leads to good coupling. Therefore, the total weight or mass of the device bears on the earth's surface. This force will increase the spring constant of the grass or vegetation on which the geophone is planted by exceeding the elastic limit of its spring-like quality. Preferably, the natural frequency of the movable mass of large inertia with respect to the base component of small inertia is kept lower than 30 cycles per second and is filtered from the seismic response.

Random frequencies generated by wind blowing across the geophone or created through brush or weeds being moved are a constant source of trouble to a seismic operator. It requires the sensitivity of a seismic recorder to be reduced to a quiet level. This in turn requires more explosive to be used to overcome the lack of sensitivity of the instruments.

The arrangement in conventional geophones causes the amplitude of wind noise to be increased as the resonant frequency of coupling is reached. However, this problem is largely eliminated by the present invention due to the high mass ratio. The high mass resonant frequency is below the seismic range the lighter element resonant frequency to the earth is above the seismic range (200 c.p.s.).

The above and other objects and features of the invention will be more fully appreciated from the following detailed description when read with the accompanying drawings in which:

FIG. 1 is a vertical sectional view of a vibration responsive device fabricated in accordance with the present invention;

FIG. 2 is a vertical sectional view of a geophone with modified suspension means adapted for viscous fluid damping and;

FIG. 3 is a vertical sectional view similar to FIG. 1 illustrating another modification of the present invention.

In order to facilitate an understanding the invention the specific embodiments shown in the drawings are hereafter described in detail. Referring now to FIG. 1, a detector unit embodying the present invention has been illustrated in sectional form as comprising a lower casing 2 and an upper casing 3 separated by an elastic ring member 4 which, for example, can be rubber or some other material capable of resiliently suspending the upper casing from the lower one. A suitable coil form designated at 6 comprising a somewhat cup-shaped spool of aluminum or other non-magnetic material is shown carrying an electrical winding or coil 7. The lower end of the coil form is provided with a central supporting means having an elongated shaft 8 of light-weight construction extending therefrom, which shaft is parallel to the longitudinal axis of the upper and lower housings and makes contact with the lower casing 2 at a point designated 10. The coil form is supported from suitable flat disc positioning springs 12 and 14 which have their outer edges respectively disposed on spring support arms 13 and 15 affixed to the upper casing. Thus, the lower casing and the coil form with its supporting shaft form a rigid base component of small inertia which in accordance with the present invention is coupled to the earth. The upper and lower casings can be of any suitable material designed to protect the coil and magnet assembly from physical damage by shock and chemical damage from environmental conditions. Typically, brass or aluminum casings will be employed.

The specific embodiment of the present invention which is illustrated in FIG. 1 is a moving coil, electromagnetic type of detector in which the moving coil cuts constant lines of force. In the figure there is shown disposed within the chamber defined within upper casing 3, a magnetic assembly comprising an annular permanent magnet having a pole piece 17 and a pole ring 18 assembled to define between portions of the pole piece and pole ring a uniform annular air gap having substantially uniform lines of force passing therethrough. Specifically the magnet can be formed, for example, of magnetic material of the type now available on the market and designated commonly by the term "Alnico." A soft iron core can be employed.

In a seismic operation the vibration responsive device is placed on the ground and an explosive is detonated at a distance from it. The rigid light-weight base component comprising the lower casing and the coil form moves in response to vibrations of the earth. The core and the magnet assembly mounted on the elastic ring member 4 have a substantial amount of static inertia and tend to remain stationary. The lower casing when moves relative to the magnet and current is generated in the coil. High frequency earth vibrations thus cause movement only of the lighter elements of the geophone the construction permitting the massive elements to remain insensitive to these frequencies during the length of time that a desired seismic reflection is being received. As the device is dynamically light, faithful recording of the earth's motion through grass or other vegetation is insured because the geophone is held in contact with the earth by the force equal to the large mass comprising the magnet assembly plus the mass of the lighter elements. Preferably, the mass ratio of the movable mass to the base component is in the range of 1:1 to 15:1. High fidelity recordings in accordance with the present invention are not obtained when the mass ratio of a movable mass to the base component is appreciably less than 1:1. The upper limit of 15:1 is established by structural rigidity considerations for field operations and mass production fabrication processes. A mass ratio range of between 8:1 and 12:1 is especially preferred.

It has been found that when a geophone is placed on the surface of the earth the geophone case-earth system is resonant and has a characteristic resonant frequency which is a function of the weight of the geophone, the base area of the geophone and the elastic constants of the vegetation and other near surface material. Thus, with the dynamic type geophone which has been described, a high degree of coupling between the earth and the instrument is achieved by coupling the small mass directly to the ground while the inertia element of large mass is resiliently suspended from the lower instrument casing.

Alternative embodiments of the invention described above are shown in FIGS. 2 and 3. In FIG. 2 the geophone shown differs from the one previously described, primarily in that a metallic damping cup 31 is used as an element of the base component of small inertia. For the purpose of supporting an electrical winding or coil within the air gap defined by the pole piece 32 and pole ring 33 to cut the constant lines of force across the air gap in response to a movement of the coil within this air gap, there is provided a suitable coil form designated at 34 with its open end disposed to receive the projection of the magnetic pole piece. Wound around the outer surface of the cup-shaped spool is an electrical winding 35. The lower end of the coil form is provided with a central supporting means having an elongated shaft 36 extending therefrom which shaft is parallel to the axis of the cylindrical geophone housing and projects through the permanent magnet having a small bore cylindrical hole drilled through its longitudinal axis. In this embodiment the base component of small inertia comprises the damping cup and a coil form with its supporting means affixed thereto, and the entire magnet assembly is suspended from suitable flat disc suspension springs designated as 38 and 39. Thus, the entire magnetic assembly is resiliently mounted in a cylindrical geophone casing 44 for reciprocal movement with respect to the coil mounted upon the damping cup forming the base of the device. The magnetic assembly functions as an inertia weight or steady mass. Flexure of the springs allows the magnet assembly and the casing to move freely with respect to the coil. The casing is affixed to a base plate 45 which has a raised annular lip 46 projecting into a circular well 47 cut into damping cup 31. In conventional operation the inertia of the movable mass holds the magnetic assembly motionless while the earth's vibration moves the damping cup base and the coil.

The damping cup 31 forming an element of the base component of the vibration responsive device shown in FIG. 2 is designed to carry a damping fluid 40 in a circular well surrounded by raised fluid retaining lips 41 and 42 and resilient bellows sections 70 and 71 forming a seal. In general, any viscous inert fluid is suitable for use as a damping fluid. Advantageously, the fluid is a silicone type having a viscosity in the range of 100 to 500 centistokes.

An alternative arrangement in accordance with the present invention is shown in FIG. 3. In this arrangement the spring suspended magnetic assembly and geophone casing are resiliently suspended from the base component of small inertia by means of three symmetrically spaced support legs affixed to the outer geophone casing. Two support legs 51 and 52 are shown in FIG. 3 affixed to the geophone casing 53 and suspended from a coil from supporting shaft 54 by means of two disc suspension springs 56 and 57. The other end of the supporting shaft is threaded onto base plate 60. Operation is similar to that of the devices described above.

From the above description it will be apparent that there has been described a dynamically light geophone which can be actuated by a minimum of energy. From the detailed description it is believed that the operation of the vibration sensitive devices of high sensitivity will be apparent to those skilled in the art. It is understood that such devices, fabricated in accordance with the present invention, can be placed at specific distances along the length or made an intricate part of a seismic cable. Each of the cable lengths containing a number of detectors can then be merely dragged to a selected location or plugged or connected into a trunk cable. The geophones would then be set into position.

Further, it will be apparent that modifications in the vibration responsive devices described and illustrated can be made without changing the fundamentals of operation. For example, instead of the coil, the rigid base component can include the magnet assembly and the movable mass can include a signal generating coil of large inertia. Also, it may be advantageous to use other forms of damping such as air or electromagnetic damping rather than viscous fluid damping. While specific embodiments of the present invention have been described it will be evident to one skilled in the art that various other changes may be made without departing from the spirit or scope of the invention and it is intended to embrace such changes in the appended claims.

What is claimed is:

1. An improved geophone having high sensitivity which comprises a housing having an opening in the lower portion thereof, a magnet assembly containing an annular air gap mounted within said housing in fixed relationship thereto, an annular coil extending into said air gap in said housing for reciprocal movement of said coil with respect to said magnet assembly and housing, a shaft connected to said coil and extending below said opening in said housing, disc springs resiliently supporting said housing and magnet assembly upon said shaft, and a base of low inertia independent of said housing and magnet assembly upon which said shaft is supported.

2. A geophone as defined by claim 1 wherein the mass of said magnet assembly and housing is from about 8 to about 12 times the mass of said coil, shaft and base.

3. A geophone as defined by claim 1 wherein a resilient ring is interposed between said housing and said base and wherein said shaft makes point contact with said base.

4. A geophone as defined by claim 1 wherein said base includes an annular chamber containing a viscous liquid, an annular lip is attached to the lower surface of said housing beneath said magnet assembly and extends into said annular chamber in said base, and annular resilient seals are provided between said base and said housing to prevent loss of said viscous liquid.

5. A vibration detector which comprises a magnet assembly containing an annular air gap, an annular coil assembly positioned within said air gap and reciprocally movable with respect to said magnet assembly, a supporting member connected to said coil assembly and extending below said magnet assembly, a housing affixed to said magnet assembly, a base member of low inertia upon which said supporting member is mounted, and means resiliently suspending said magnet assembly and housing from said supporting member.

6. A vibration detector which comprises a housing having an opening in the lower surface thereof; a magnet assembly containing an annular air gap mounted in fixed position within said housing; a coil assembly positioned within said air gap and reciprocally movable with respect to said magnet assembly and housing; a supporting member connected to said coil assembly and extending through said opening in said housing; a base member of low inertia upon which said supporting member is positioned; spring means for resiliently suspending said magnet assembly and housing with respect to said coil assembly, said supporting member and said base member; and a resilient ring interconnecting said base member and said housing about said supporting member.

7. A vibration detector which comprises a housing containing an opening in the lower surface thereof; a magnet assembly containing an annular air gap mounted in a fixed position with said housing; a coil assembly positioned within said air gap and reciprocally movable with respect to said magnet assembly and housing; a supporting member connected to said coil assembly and extending through said opening in said housing; a base member of low inertia upon which said supporting member is mounted, said base member containing a recess into which said housing member extends; spring means for resiliently suspending said magnet assembly and housing with respect to said coil assembly, supporting member and base member; and a resilient seal between said base member and said housing for preventing loss of a damping fluid contained in said recess in said base member.

References Cited in the file of this patent

UNITED STATES PATENTS

| | | |
|---|---|---|
| 2,038,101 | Dudley | Apr. 21, 1936 |
| 2,316,616 | Powell | Apr. 13, 1943 |
| 2,387,223 | Carson | Oct. 16, 1945 |
| 2,675,533 | Brown | Apr. 13, 1954 |
| 2,748,370 | Baltosser | May 29, 1956 |
| 2,754,435 | Ongaro | July 10, 1956 |
| 2,756,406 | Schurman | July 24, 1956 |
| 2,788,512 | Reichert | Apr. 9, 1957 |